United States Patent
Snyder

(10) Patent No.: US 6,726,247 B1
(45) Date of Patent: Apr. 27, 2004

(54) METHOD AND APPARATUS FOR RETRACTING A SUPPORT LEG

(76) Inventor: Leon J. Snyder, 3643 Karr Ave., Wall Lake, IA (US) 51466

( * ) Notice: Subject to any disclaimer, the term of this patent is extended or adjusted under 35 U.S.C. 154(b) by 24 days.

(21) Appl. No.: 10/106,654

(22) Filed: Mar. 26, 2002

(51) Int. Cl.$^7$ ................................................ B60S 9/02
(52) U.S. Cl. ............................ 280/766.1; 280/763.1; 280/765.1; 254/45
(58) Field of Search ................ 280/766.1, 763.1, 280/764.1, 765.1, 295, 298, 478.1, 479.2, 847, 822, 823; 254/419, 45, 94; 248/159, 161, 405, 407, 188.5; 212/301, 295, 296, 305; 70/202, 203, 94, 14

(56) References Cited

U.S. PATENT DOCUMENTS

| | | | |
|---|---|---|---|
| 1,488,406 A | | 3/1924 | Morrison |
| 1,727,430 A | * | 9/1929 | Gilkison .................. 280/763.1 |
| 2,240,430 A | | 4/1941 | Willard |
| 3,281,160 A | | 10/1966 | Vinther et al. |
| 3,448,998 A | | 6/1969 | Abolins |
| 3,489,428 A | * | 1/1970 | Hunter et al. ............. 280/765.1 |
| 3,589,748 A | | 6/1971 | Miller |
| 3,647,209 A | * | 3/1972 | La Lanne ................. 248/218.4 |
| 3,682,497 A | | 8/1972 | Dalton |
| 3,689,029 A | * | 9/1972 | Bargman, Jr. ................. 254/45 |
| 3,709,467 A | * | 1/1973 | Mann ........................... 254/45 |
| 3,881,746 A | * | 5/1975 | Newcomb, Jr. .......... 280/763.1 |
| 4,050,718 A | * | 9/1977 | Newcomb, Jr. .......... 280/763.1 |
| 4,216,939 A | * | 8/1980 | Valdespino .................... 254/45 |
| 4,603,878 A | * | 8/1986 | Smith, Jr. ................. 280/479.2 |
| 4,863,184 A | | 9/1989 | Mena |
| 5,340,143 A | * | 8/1994 | Williams, Jr. ................ 280/475 |
| 5,423,518 A | * | 6/1995 | Baxter et al. ................ 254/419 |
| 5,575,492 A | | 11/1996 | Stone |
| 5,913,382 A | * | 6/1999 | Martin ..................... 248/188.5 |
| 6,082,680 A | * | 7/2000 | Woodward et al. ...... 248/188.5 |
| 6,347,777 B1 | * | 2/2002 | Webber et al. ........... 248/188.5 |
| 6,551,226 B1 | * | 4/2003 | Webber et al. .............. 482/148 |

* cited by examiner

Primary Examiner—Brian L. Johnson
Assistant Examiner—Hau Phan
(74) Attorney, Agent, or Firm—McKee, Voorhees & Sease, P.L.C.

(57) ABSTRACT

A method and apparatus for retracting a support leg includes a telescoping inner leg member contained in an outer leg member. A spring-loaded pin engages the inner leg member. To lower the leg, the spring-loaded pin is removed allowing the inner leg member to extend to a desired position. When in the desired position, the spring-loaded pin is released and the pin reengages the inner leg member. To raise the inner leg member, the spring-loaded pin is removed until a slidable trip member falls. The slidable trip member then blocks the spring-loaded pin from reengaging the inner leg member. The inner leg member is raised, the trip member lifted, and the inner leg member secured in a proper position for travel. The inner leg member can be raised by a cable attached to the inner leg member to allow one-handed operation of the entire system.

6 Claims, 3 Drawing Sheets

METHOD AND APPARATUS FOR RETRACTING A SUPPORT LEG

BACKGROUND OF THE INVENTION

1. Field of the Invention

The present invention relates generally to stabilizing vehicles in a set parked position. More specifically, though not exclusively, the present invention relates to a method and apparatus for extending and retracting a stabilizing leg connected to a vehicle.

2. Background of the Invention

Fifth wheel trailers, campers, boat trailers, and other vehicles are widely used for travel and recreation as well as many other applications. After travel to a desired location, these vehicles may be prepared for use as living quarters, work stations, or other purposes by leveling the vehicle and taking measures to restrain it from undergoing motions due to actions of wind or movement of occupants inside.

A wide variety of devices have been used to stabilize such vehicles, including the jack mechanism of U.S. Pat. No. 2,240,430; the landing gear mechanism of U.S. Pat. No. 4,863,184; the trailer jack of U.S. Pat. No. 3,281,160; the semi-trailer jack of U.S. Pat. No. 1,488,406; and the stabilizing assembly of U.S. Pat. No. 5,575,492. Such mechanisms generally fall into two categories, manually operated mechanisms and automatically operated mechanisms.

Manually operated mechanisms, such as that shown in U.S. Pat. No. 3,682,497 have become increasing complex. Such systems add unnecessary weight and expense to a vehicle. Moreover, the number of parts involved in such systems raises reliability concerns. Other manual systems, such as that shown in U.S. Pat. No. 5,575,492, require two hands to operate. Further, a user must bend over to pick up the extended support legs and push them into a retracted position. Manual operation is typically time consuming and laborious. Therefore, there is a need for a vehicle stabilizing apparatus and method that is relatively inexpensive an easy to use.

Therefore, a general feature of the present invention is the provision of a method and apparatus for extending and retracting a supporting leg for a vehicle which overcomes the problems found in the prior art.

A further feature of the present invention is the provision of a method and apparatus for extending and retracting a support leg for a vehicle that is inexpensive to install.

Another feature of the present invention is the provision of a method and apparatus for extending and retracting a support leg for a vehicle that is relatively easy to use.

A still further feature of the present invention is the provision of a method and apparatus for extending and retracting a support leg of a vehicle that can be operated with one hand.

These, as well as other features and advantages of the present invention, will become apparent from the following specification and claims.

SUMMARY OF THE INVENTION

The present invention generally comprises a method and apparatus for extending and retracting a support leg of a vehicle. The apparatus generally includes an inner leg member and an outer leg member. The inner leg member is slidably extendible from the outer leg member to a desired height. The inner leg member is secured in a proper position by a pin that extends through the outer leg member. The pin is preferably a spring-based pin. Access to the inner leg member is controlled by a trip slide member. Upon removal of the pin, the trip slide member may be allowed to fall, thus preventing access to the inner leg member. Alternatively, the trip slide member may be kept in a position that allows access to the inner leg member. This allows the user to selectively control the movement of the inner leg member. Preferably, a foot pad is secured to the bottom of the inner leg member to provide additional stability. A cable may be secured to the foot pad and extend upward to a pulley. A handle on the end of the cable allows a user to retract the inner leg member while maintaining an upright position. The slide and pin assembly may be secured to an existing outer leg member, or may be integral therewith.

DETAILED DESCRIPTION OF THE PREFERRED EMBODIMENT(S)

The present invention will be described as it applies to its preferred embodiment. It is not intended that the present invention be limited to the described embodiment. It is intended that the invention cover all modifications and alternatives which may be included within the spirit and scope of the invention.

Figure 1:
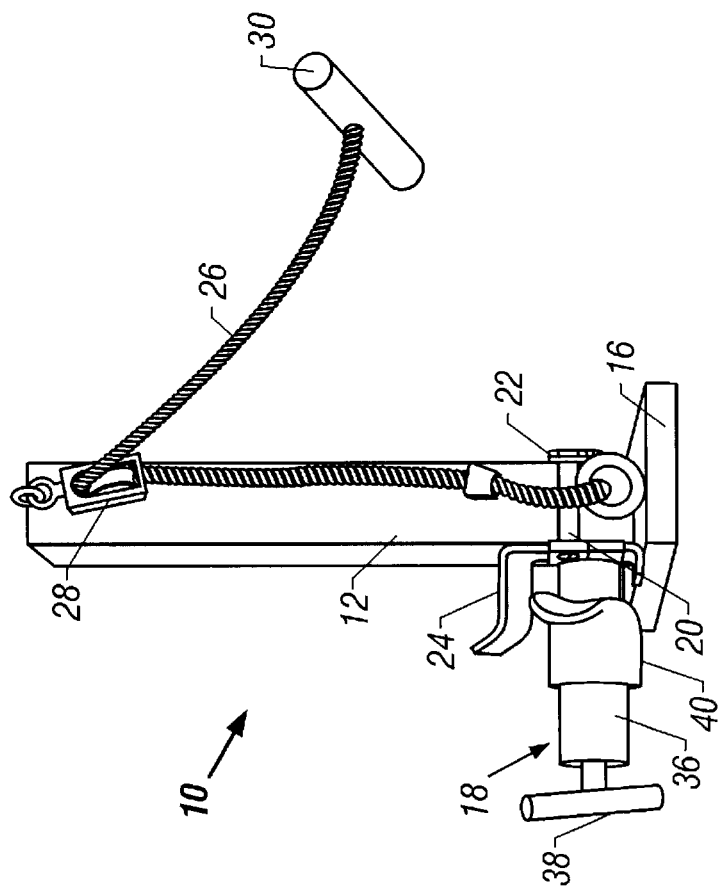
FIG. 1 is a perspective view of the apparatus for stabilizing a vehicle of the present invention shown in a retracted position.
Figure 3:
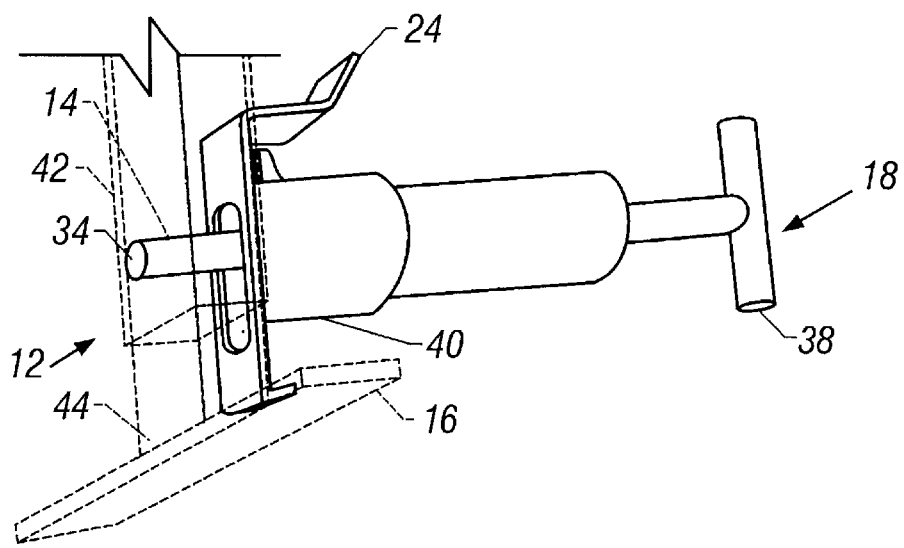
FIG. 3 is a sectional view of the securing portion of the present invention.
Figure 4:
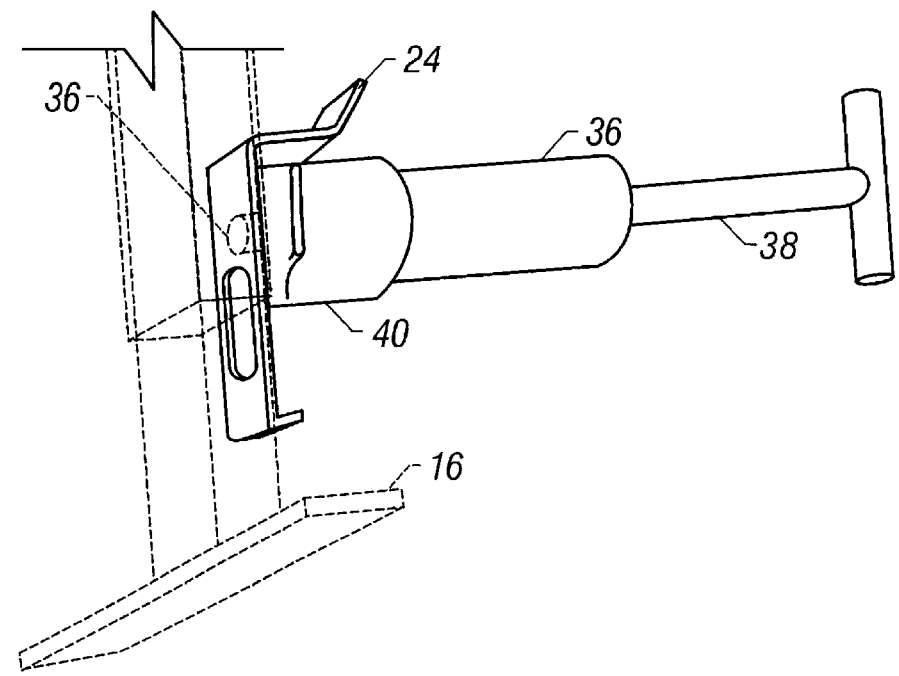
FIG. 4 is a sectional view of the securing portion of the present invention in a retracted position.
Figure 5:
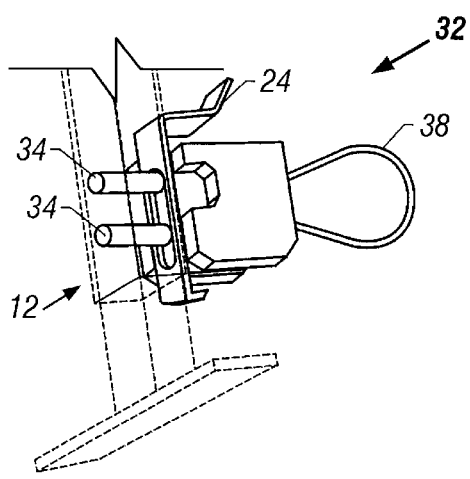
FIG. 5 is a sectional view of an alternative embodiment of the securing portion of the present invention.
Figure 7:
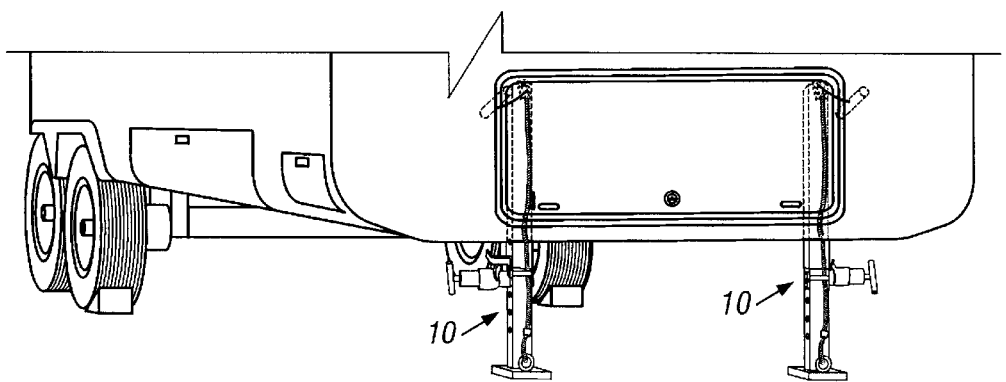
FIG. 7 is a perspective view of the present invention as installed.

The apparatus 10 for stabilizing a vehicle of the present invention is generally shown in FIG. 1 and is shown as installed on a vehicle in FIG. 7. The vehicle may be any type of fifth wheel trailer, camper, boat trailer, etc. The apparatus 10 may be readily accessible and located out in the open or partially contained within a compartment as shown in FIG. 7.

Figure 2:
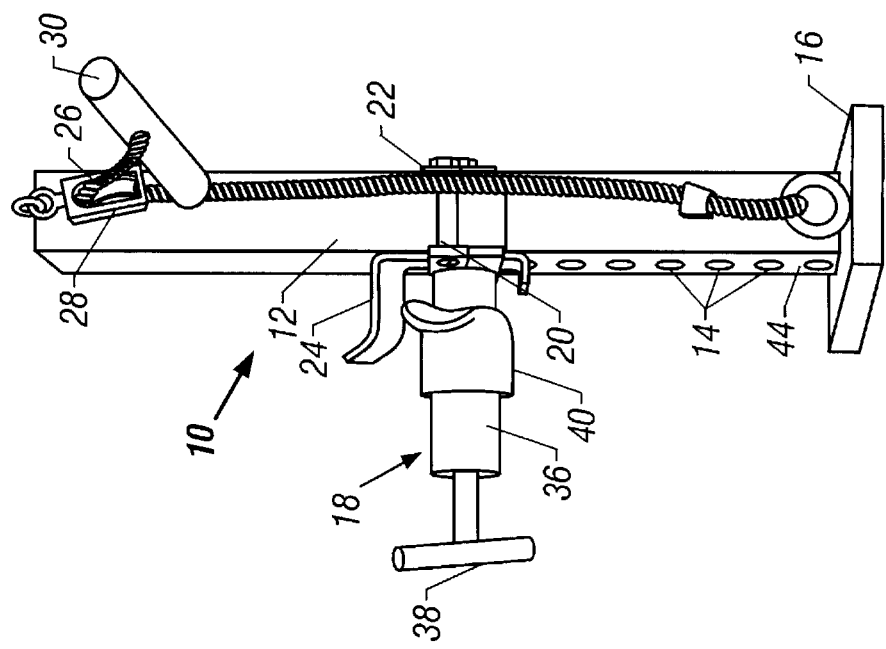
FIG. 2 is a perspective view of the apparatus for stabilizing a vehicle of the present invention shown in an extended position.
Figure 6:
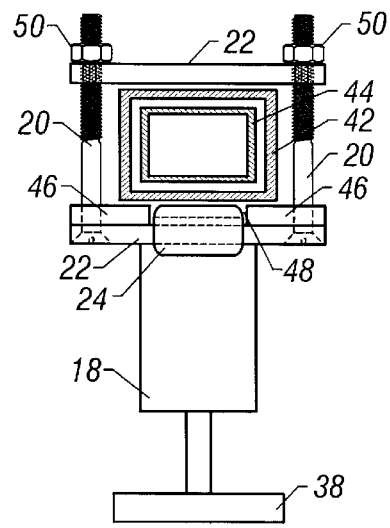
FIG. 6 is a cross-sectional view of the present invention.

The apparatus 10 generally includes a leg 12 that includes an outer leg member 42 and an inner leg member 44 as is shown in FIG. 2. Preferably, a spring-loaded pin 18 is secured to the outer leg member 42. As shown in FIG. 6, the spring-loaded pin 18 is welded to a plate 22. A pair of spacers 46 are also secured to the plate 22 and abut against one side of the outer leg member 42. The spacers 46 create a gap 48 that allows a trip member or slider 24 to freely move.

Another plate 22 is placed on the opposite side of the outer leg member 42. The two plates 22 are connected by any suitable means, such as with plurality of bolts 20 and nuts 50 as shown. Thereby the spring pin 18 is secured to the leg 12. In this fashion, a leg 12 on an existing trailer may be retrofitted with the present invention. Alternatively, the apparatus 10 may be integrally formed with the outer leg member 42 during manufacture.

The pin 34 of the spring pin 18 is typically contained in a housing 36 and may be retracted using a handle portion 38. In operation, the pin naturally tends towards its engaged position. In its engaged position, the pin 34 extends through a hole, corresponding in size to the pin 34, in the outer leg member 42 to contact and secure the inner leg member 44. Typically, the inner leg member 44 will contain a plurality of holes 14. This allows a user to select a desired extended position of the inner leg 44.

To retract the pin 34 from contact with the inner leg member 44, a user simply pulls back on the handle 38 of the spring pin 18. However, because of the natural tendency of the spring pin 18 to return to the engaged position, a trip member or slider 24 is used to prevent the spring pin 18 from reengaging the inner leg member 44. The slider 24 has two general portions. The first portion includes a slot through which the pin 34 may freely pass. The second upper portion rests on top of the pin 34 when the pin 34 is in the engaged position. When the pin 34 is removed from underneath the upper portion of the slider 24, the slider 24 falls into a blocking position. In this position, the solid upper portion of the slider 24 prevents the pin 34 of the spring-loaded pin 18 from extending back into the engaged position. Thereby, the inner leg member 44 may be freely extended or retracted.

Preferably, a cable or rope 26 is secured to the foot 16 on the bottom of the inner leg member 44. The cable or rope 26 travels up the leg 12 to a pulley 28. Alternatively, the rope or cable 26 could simply travel through a hole in either the leg 12 or the vehicle itself. Other attachment means could be used so long as the rope or cable 26 can freely travel therethrough. The cable or rope 26 may terminate in a handle 30 to allow a user to easily pull on the cable 26 and thereby raise the lower leg member 34 in a retracted positions.

In operation, a user may ensure the slider 24 is maintained in its initial engagement position by rotating a spacer 40. Then, the user may retract the pin 34 of the spring-loaded pin 18 by pulling on the handle 38. Once the pin 34 is completely removed from contact with the inner leg member 44, gravity will cause the inner leg member 44 to fall into an extended position. When the foot 16 attached to the inner leg member 44 contacts the ground, the user may release the handle 38. Releasing the handle 38 causes the pin 34 of the spring-loaded pin 18 to reengage the inner leg member 44 through the corresponding hole 14. In this manner, the leg 12 secures the vehicle in a proper position.

To properly prepare the vehicle for travel, the user must retract the inner leg member 44 into a safe position.

To accomplish this, the user turns the spacer 40 to a position which will allow the slider 24 to freely move. Next, the user pulls on the handle 38 to retract the pin 34 of the spring-loaded pin 18. When the pin 34 is sufficiently retracted, the slider 24 will fall and the upper portion thereof will block the pin 34 from reengaging the inner leg member 44. This allows the user to use one hand to retract the inner leg member 44 into the outer leg member 42. Preferably, the user may simply pull on the handle 30 secured to the cable 26 to raise the inner leg member 44 into a safe retracted position.

When the inner leg member 44 is fully retracted, the foot 16 will contact the slider 24, causing the slider 24 to rise. This moves the solid upper portion of the slider 24 away from the pin and allows the pin to freely travel through the slotted portion of the slider 24. When the pin 34 can freely move through the slotted portion of the slider 24, it will naturally reengage a corresponding hole 14 in the inner leg member 44 thereby securing the inner leg member 44 in a retracted position. This allows a user to easily stabilize a vehicle using one hand.

The general description of the present invention as well as the preferred embodiment of the present invention has been set forth above. Those skilled in the art to which the present invention pertains will recognize and be able to practice additional variations in the methods and devices described which fall within the teachings of this invention. Accordingly, all such modifications and additions are deemed to be within the scope of the invention which is to be limited only by the claims appended hereto.

What is claimed is:

1. An apparatus for stabilizing a vehicle, the apparatus comprising:

a vehicle having at least one extendible and retractable leg including an inner telescoping leg member and an outer leg member;

a pin securing the inner telescoping leg member in position; and movable slider, which is slidable relative to the outer leg member to selectively prevent the pin from securing the inner telescoping leg member, wherein a user can pull back on the pin allowing the moveable slider to fall downwardly such that the movable slider keeps the pin from securing the inner telescoping leg member.

2. The apparatus for stabilizing a vehicle of claim 1 wherein the pin is a spring-loaded pin.

3. The apparatus for stabilizing a vehicle of claim 1 wherein a cable is secured to the inner telescoping leg member for use in raising the inner telescoping leg member from an extended position.

4. The apparatus for stabilizing a vehicle of claim 3 wherein a handle is secured to the cable.

5. The apparatus for stabilizing a vehicle of claim 1 further comprising a spacer operatively and selectively engaging the movable slider.

6. A support leg securement device for a vehicle, the securement device comprising:

an adjustable leg including an inner leg member and an outer leg member, a retractable pin that, in an engaged position secures the inner leg member in a locked position relative to the outer leg member;

a slidable trip member, which is slidable relative to the outer leg member having a slotted and solid portion wherein the slotted portion allows the pin to freely engage the inner leg member, wherein a user can pull back on the retractable pin allowing the slidable trip member to fall downwardly such that the solid portion of the slidable trip member keeps the retractable pin from re-engagment the inner leg member.

* * * * *